US008870453B2

(12) United States Patent
Branch

(10) Patent No.: US 8,870,453 B2
(45) Date of Patent: Oct. 28, 2014

(54) SYSTEM, METHOD AND COMPUTER PROGRAM PRODUCT FOR MONITORING TEMPERATURE

(75) Inventor: Clinton A. Branch, Jacksboro, TX (US)

(73) Assignee: ShockWatch, Inc., Dallas, TX (US)

( * ) Notice: Subject to any disclaimer, the term of this patent is extended or adjusted under 35 U.S.C. 154(b) by 461 days.

(21) Appl. No.: 12/942,672

(22) Filed: Nov. 9, 2010

(65) Prior Publication Data

US 2012/0114010 A1    May 10, 2012

(51) Int. Cl.
*G01K 3/04*    (2006.01)
*G01K 7/00*    (2006.01)
*G06F 11/07*    (2006.01)

(52) U.S. Cl.
CPC ........................................ *G01K 3/04* (2013.01)
USPC ............ 374/170; 340/588; 702/183; 374/102

(58) Field of Classification Search
USPC ................. 374/100–106, 109, 141, 208, 170; 702/130, 132–136, 182, 183, 118, 187; 340/588, 584; 116/216; 703/2; 712/220
See application file for complete search history.

(56) References Cited

U.S. PATENT DOCUMENTS

| | | | |
|---|---|---|---|
| 3,230,358 A * | 1/1966 | Davis et al. .................... | 708/829 |
| 3,499,323 A * | 3/1970 | Sturges ....................... | 73/112.01 |
| 3,961,323 A | 6/1976 | Hartkorn | |
| 4,462,023 A | 7/1984 | Nielsen et al. | |
| 4,496,829 A * | 1/1985 | Black et al. .................... | 219/497 |
| 4,575,803 A * | 3/1986 | Moore .......................... | 701/100 |
| 4,604,871 A * | 8/1986 | Chiu et al. ...................... | 62/136 |
| 4,621,502 A * | 11/1986 | Ibrahim et al. .................. | 62/223 |
| 4,685,061 A | 8/1987 | Whitaker | |
| 4,750,197 A | 6/1988 | Denekamp et al. | |
| 4,972,099 A | 11/1990 | Amanao et al. | |
| 5,244,146 A * | 9/1993 | Jefferson et al. ................. | 236/11 |
| 5,254,992 A * | 10/1993 | Keen et al. ..................... | 341/119 |
| 5,262,758 A * | 11/1993 | Nam et al. ..................... | 340/588 |
| 5,313,848 A | 5/1994 | Santin et al. | |
| 5,403,093 A * | 4/1995 | Flynn et al. .................... | 320/150 |
| 5,424,720 A | 6/1995 | Kirkpatrick | |
| 5,442,669 A | 8/1995 | Medin | |
| 5,452,335 A * | 9/1995 | Slater et al. ...................... | 377/25 |
| 5,528,228 A | 6/1996 | Wilk | |
| 5,798,694 A | 8/1998 | Reber et al. | |
| 5,835,012 A | 11/1998 | Wilk | |
| 5,844,862 A | 12/1998 | Cocatre-Zilgien | |
| 5,867,809 A | 2/1999 | Soga et al. | |

(Continued)

FOREIGN PATENT DOCUMENTS

| | | |
|---|---|---|
| WO | WO 9909637 A1 * | 2/1999 |
| WO | 9935453 | 7/1999 |
| WO | WO 0150103 A1 * | 7/2001 |

*Primary Examiner* — Gail Kaplan Verbitsky
(74) *Attorney, Agent, or Firm* — James L. Baudino

(57) ABSTRACT

According to one aspect of the present disclosure, a device and technique for monitoring temperature of an environment of a sensitive object is disclosed. The device includes a housing configured to be disposed within or affixed to a transport container for the object, a sensor coupled to the housing and configured to obtain a plurality of temperature readings, and monitor logic configured to compare the plurality of temperature readings to a temperature threshold. The device also includes counter logic configured to generate an excursion count indicating a quantity of time periods the temperature readings exceeded the temperature threshold, generate a consecutive count indicating a quantity of consecutive temperature readings exceeding the temperature threshold, and generate a cumulative count indicating a cumulative quantity of temperature readings exceeding the temperature threshold.

17 Claims, 6 Drawing Sheets

(56) References Cited

U.S. PATENT DOCUMENTS

| | | | |
|---|---|---|---|
| RE36,200 E * | 4/1999 | Berrian et al. ............... 73/866.2 |
| 5,917,416 A | 6/1999 | Read |
| 5,936,523 A | 8/1999 | West |
| 6,034,607 A | 3/2000 | Vidaillac |
| 6,046,674 A | 4/2000 | Irwin et al. |
| 6,046,678 A | 4/2000 | Wilk |
| 6,185,513 B1 | 2/2001 | Plettner et al. |
| 6,275,779 B1 | 8/2001 | Pohle et al. |
| 6,286,992 B1 * | 9/2001 | Kyrtsos ........................ 374/45 |
| 6,320,512 B1 | 11/2001 | Nicholson et al. |
| 6,326,892 B1 | 12/2001 | De La Forterie |
| 6,411,916 B1 | 6/2002 | Pellerin |
| 6,424,930 B1 * | 7/2002 | Wood ........................... 702/184 |
| 6,438,502 B1 | 8/2002 | Awtrey et al. |
| 6,501,390 B1 | 12/2002 | Chainer et al. |
| 6,555,789 B2 | 4/2003 | Owens et al. |
| 6,570,508 B1 | 5/2003 | Kvenvold |
| 6,643,608 B1 | 11/2003 | Hershey et al. |
| 6,712,276 B1 | 3/2004 | Abali et al. |
| 6,753,830 B2 | 6/2004 | Gelbman |
| 6,771,177 B2 | 8/2004 | Alderman |
| 6,806,808 B1 | 10/2004 | Watters et al. |
| 6,811,305 B2 | 11/2004 | Laycock |
| 6,847,912 B2 | 1/2005 | Forster |
| 6,850,861 B1 | 2/2005 | Faiola et al. |
| 6,856,247 B1 | 2/2005 | Wallace |
| 6,865,516 B1 | 3/2005 | Richardson |
| 6,889,165 B2 | 5/2005 | Lind et al. |
| 6,924,781 B1 | 8/2005 | Gelbman |
| 6,950,028 B2 | 9/2005 | Zweig |
| 6,970,100 B2 | 11/2005 | Lovegreen et al. |
| 6,985,408 B2 | 1/2006 | Quine |
| 7,004,621 B2 | 2/2006 | Roberts et al. |
| 7,057,495 B2 | 6/2006 | Debord et al. |
| 7,081,811 B2 | 7/2006 | Johnston et al. |
| 7,102,526 B2 | 9/2006 | Zweig |
| 7,140,768 B2 * | 11/2006 | Prabhakar ..................... 374/186 |
| 7,142,110 B2 | 11/2006 | Schmidtberg et al. |
| 7,165,015 B2 | 1/2007 | Roberts |
| 7,225,107 B2 * | 5/2007 | Buxton et al. ................. 702/183 |
| 7,250,858 B2 | 7/2007 | Schmidtberg et al. |
| 7,253,731 B2 | 8/2007 | Joao |
| 7,378,954 B2 | 5/2008 | Wendt |
| 7,409,310 B1 | 8/2008 | Wade |
| 7,417,417 B2 | 8/2008 | Williams et al. |
| 7,455,225 B1 | 11/2008 | Hadfield et al. |
| 7,482,920 B2 | 1/2009 | Joao |
| 7,487,037 B2 | 2/2009 | Schmidtberg |
| 7,495,400 B2 * | 2/2009 | Testin ........................... 318/268 |
| 7,552,029 B2 * | 6/2009 | Elwood et al. ................. 702/188 |
| 7,680,622 B2 * | 3/2010 | Dupuy et al. ................. 702/132 |
| 8,154,417 B2 * | 4/2012 | Hauenstein et al. .......... 340/683 |
| 2002/0163436 A1 * | 11/2002 | Singh et al. ................... 340/584 |
| 2003/0198135 A1 * | 10/2003 | Beatty et al. .................... 368/10 |
| 2004/0113783 A1 | 6/2004 | Yagesh |
| 2005/0157774 A1 | 7/2005 | DiLuiso et al. |
| 2005/0270709 A1 * | 12/2005 | Plemmons et al. ............. 361/32 |
| 2007/0008119 A1 | 1/2007 | Pohle et al. |
| 2007/0056369 A1 | 3/2007 | Griffin et al. |
| 2007/0203650 A1 * | 8/2007 | Jensen et al. ...................... 702/3 |
| 2007/0215599 A1 * | 9/2007 | Kahler ........................... 219/492 |
| 2007/0243621 A1 | 10/2007 | Zweig |
| 2007/0285238 A1 * | 12/2007 | Batra ........................... 340/572.1 |
| 2008/0052044 A1 | 2/2008 | Shoenfeld |
| 2008/0082043 A1 | 4/2008 | Janssen |
| 2008/0110391 A1 * | 5/2008 | Taylor et al. .................. 116/216 |
| 2008/0120188 A1 | 5/2008 | Mobley et al. |
| 2008/0125915 A1 * | 5/2008 | Berenbaum et al. .......... 700/278 |
| 2008/0144697 A1 | 6/2008 | Stewart et al. |
| 2010/0244574 A1 * | 9/2010 | Nishino et al. ................. 307/80 |
| 2011/0006109 A1 * | 1/2011 | Nemet et al. ................... 235/375 |

* cited by examiner

SYSTEM, METHOD AND COMPUTER PROGRAM PRODUCT FOR MONITORING TEMPERATURE

BACKGROUND

During manufacturing, storage or transit, many types of objects need to be kept within a particular range or not exceed some temperature value. Thus, it is desirable to monitor the temperature of the object or the environment proximate to the object to verify the conditions to which the object has been exposed.

BRIEF SUMMARY

According to one aspect of the present disclosure, a device and technique for monitoring temperature of an environment of a sensitive object is disclosed. The device includes a housing configured to be disposed within or affixed to a transport container for the object, a sensor coupled to the housing and configured to obtain a plurality of temperature readings, and monitor logic configured to compare the plurality of temperature readings to a temperature threshold. The device also includes counter logic configured to generate an excursion count indicating a quantity of time periods the temperature readings exceeded the temperature threshold, generate a consecutive count indicating a quantity of consecutive temperature readings exceeding the temperature threshold, and generate a cumulative count indicating a cumulative quantity of temperature readings exceeding the temperature threshold.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
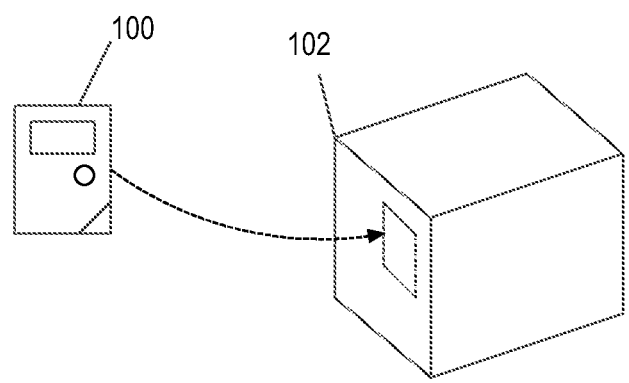
FIG. 1 is a diagram of an embodiment of a temperature monitoring device used in connection with a sensitive object packaged in a transport container.

Embodiments of the present disclosure provide a method, system and computer program product for monitoring temperature of an environment associated with a sensitive object. According to one embodiment, a temperature monitoring device includes a housing configured to be disposed within or affixed to a transport container for the object, a sensor coupled to the housing and configured to obtain a plurality of temperature readings, and monitor logic configured to compare the plurality of temperature readings to a temperature threshold. The device also includes counter logic configured to generate an excursion count indicating a quantity of time periods the temperature readings exceeded the temperature threshold, generate a consecutive count indicating a quantity of consecutive temperature readings exceeding the temperature threshold, and generate a cumulative count indicating a cumulative quantity of temperature readings exceeding the temperature threshold.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may include, but not be limited to, an electronic, magnetic, optical, electromagnetic, infrared, or semiconductor system, apparatus, or device, or any suitable combination of the foregoing such as, but not limited to, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on one device or partly on one device and partly on another device.

Aspects of the present disclosure is described below with reference to flowchart illustrations and/or block diagrams of methods, apparatus (systems) and computer program products according to embodiments of the disclosure. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the Figures and in particular with reference to FIG. 1, an exemplary diagram of a temperature monitoring device 100 is provided in which illustrative embodiments of the present disclosure may be implemented. In FIG. 1, temperature monitoring device 100 is a portable device configured to be affixed to or disposed within a transport container 102 containing therein a temperature-sensitive object (e.g., food items, pharmaceutical items, etc.). Embodiments of temperature monitoring device 100 monitor the temperature in the environment of the temperature-sensitive object during manufacturing, storage and/or transport of the object. In some embodiments, temperature monitoring device 100 may be loosely located in transport container 102. In some embodiments, temperature monitoring device 100 may be affixed to transport container 102 using, for example, adhesive materials, permanent or temporary fasteners, or a variety of different types of attachment devices. Transport container 102 may include a container in which a temperature-sensitive object is loosely placed or may comprise a container of the temperature-sensitive object itself.

Figure 2:
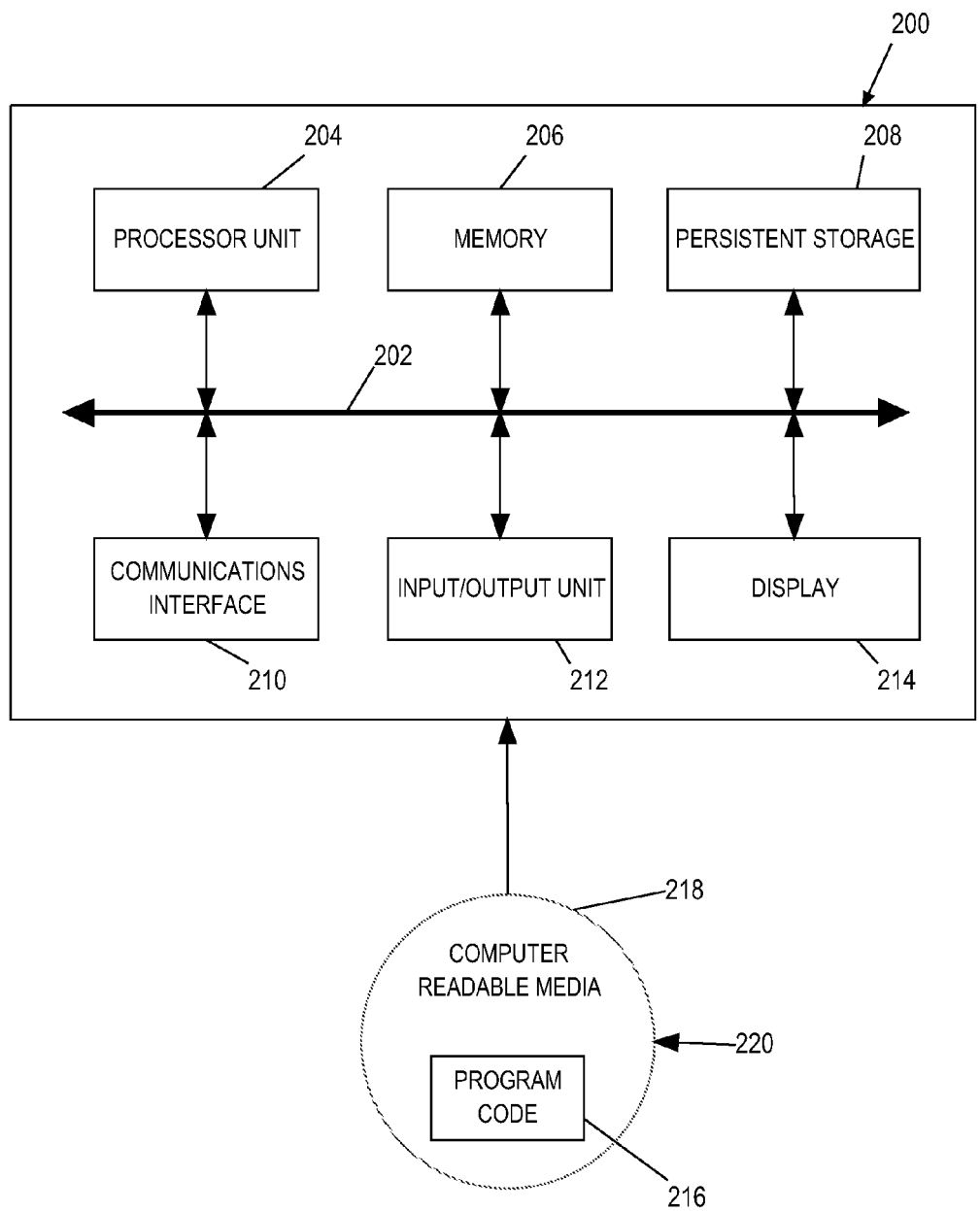
FIG. 2 is an embodiment of a data processing system in which the illustrative embodiments of the present disclosure may be implemented.

FIG. 2 is an exemplary diagram of data processing system 200 for temperature monitoring device 100 in which illustrative embodiments of the present disclosure may be implemented. It should be appreciated that FIG. 2 is only exemplary and is not intended to assert or imply any limitation with regard to the environments in which different embodiments may be implemented. Many modifications to the depicted environments may be made. System 200 includes a bus or communications fabric 202, which provides communications between processor unit 204, memory 206, persistent storage 208, communications interface 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications interface 210 provides for two-way communications with other data processing systems or devices. Communications interface 210 may include, but is not limited to, a cable modem, or a telephone modem to provide data communication connection to a corresponding type of telephone line. As another example, communications interface 210 may include peripheral interface devices, such as a Universal Serial Bus (USB) interface. Communications interface 210 may also enables the exchange of information across one or more wireless communication networks. Such networks may include cellular or short-range such as IEEE 802.11 wireless local area networks (WLANs) and the exchange of information involving the transmission of radio frequency (RF) signals through an antenna.

Input/output unit 212 enables input and output of data with other devices that may be connected to device 100. In some embodiments, input/output unit 212 may provide a connection for user input through a keypad, keyboard, trackpad, mouse or other device. Further, input/output unit 212 may send output to a printer or other type of output device. Display 214 provides a mechanism to display information to a user such as, but not limited to, a liquid crystal display (LCD).

Instructions for the operating system and applications or programs for system 200 are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 116 is located in a functional form on computer readable media 218 that is selectively removable and may be loaded onto or transferred to device 100 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to system 200. The tangible form of computer readable media 218 is also referred to as computer recordable storage media. In some instances, computer readable media 218 may not be removable.

Alternatively, program code 216 may be transferred to device 100 from computer readable media 218 through a communications link to communications interface 210 and/or through a connection to input/output unit 212. The communications link and/or the connection may be physical or wireless in the illustrative examples.

The different components illustrated for system 200 are not meant to provide architectural limitations to the manner in which different embodiments may be implemented. The different illustrative embodiments may be implemented in a data processing system including components in addition to or in place of those illustrated for system 200. Other components shown in FIG. 2 can be varied from the illustrative examples shown. For example, a storage device in system 200 is any hardware apparatus that may store data. Memory 206, persistent storage 208, and computer readable media 218 are examples of storage devices in a tangible form.

Figure 3:
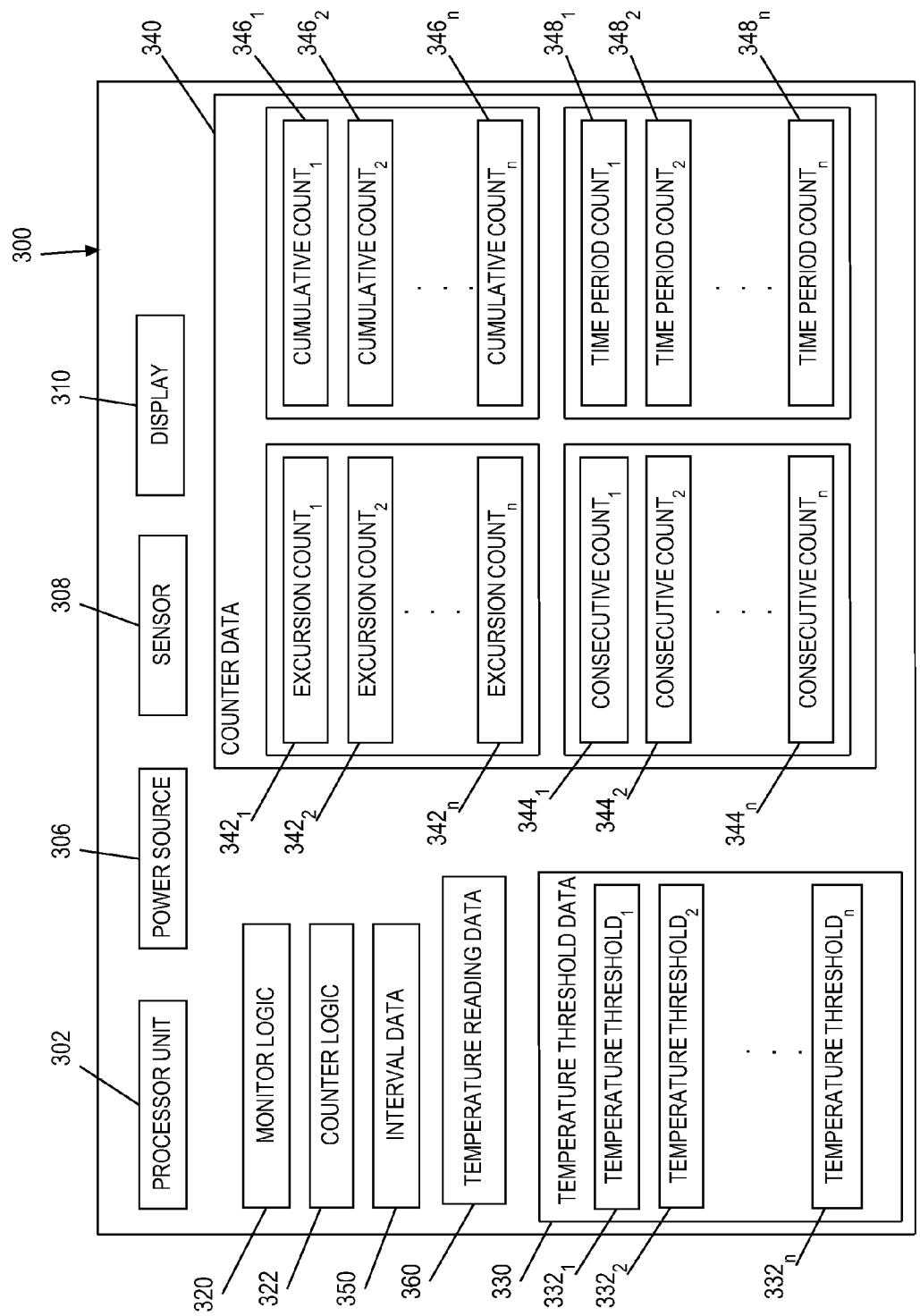
FIG. 3 is a diagram illustrating an embodiment of a data processing system in which illustrative embodiments of a temperature monitoring device of the present disclosure may be implemented.

FIG. 3 is an illustrative embodiment of a data processing system 300 to monitor and display temperature information according to the present disclosure. System 300 may be implemented on a data processing system or platform such as, but not limited to, system 200 and/or temperature monitoring device 100. In the embodiment illustrated in FIG. 3, system 300 comprises a processor unit 302, a memory 304, a power source 306, a sensor 308 and a display 310. Power source 306 may comprise any type of device for providing power to the various components of system 300 such as, but not limited to, a battery, solar cell, and/or any type of internal or external power supply. Sensor 308 may comprise any type of device for detecting and/or reading a temperature of a surrounding environment such as, but not limited to, a thermistor, a microchip temperature sensor, a thermocouple, a fiber optic sensor, etc.

In the embodiment illustrated in FIG. 3, memory 304 includes monitor logic 320, counter logic 322, temperature threshold data 330, counter data 340, interval data 350 and temperature reading data 360. Monitor logic 320 and counter logic 322 may comprise hardware, software, firmware, or a combination thereof. For example, monitor logic 320 and counter logic 322 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Temperature threshold data 330 includes one or more temperature thresholds $332_{1-n}$. For example, temperature thresholds $332_{1-n}$ may include a particular temperature of interest where exceeding the temperature (e.g., exceeding ascending or descending) is of concern or interest. Temperature thresholds $332_{1-n}$ may include preprogrammed temperatures or may be programmable (e.g., selected and/or set by a user). Interval data 350 may include a particular time interval at which temperature samples or readings are taken and/or obtained (e.g., one reading per minute). Interval data 350 may be preprogrammed, selected and/or set by a user, static and/or dynamic. For example, the temperature sampling interval may remain constant or may vary in response to changes in the temperature readings (e.g., increasing the frequency of sampling if the temperature reaches or exceeds a particular threshold $332_{1-n}$). Temperature reading data 360 comprises the temperature readings obtained by sensor 308.

Counter data 340 comprises count information associated with the different temperature readings obtained using sensor 308 relative to one or more of temperature thresholds $332_{1-n}$. In some embodiments, counter data 340 includes a count or indication of a quantity of temperature readings that exceed a particular temperature threshold $332_{1-n}$. For example, in the embodiment illustrated in FIG. 3, counter data 340 includes excursion count $342_{1-n}$, consecutive count $344_{1-n}$, cumulative count $346_{1-n}$ and time period count $348_{1-n}$. Thus, for example, each temperature threshold 332 may have associated therewith a respective excursion count 342, consecutive count 344, cumulative count 346 and time period count 348.

Excursion count 342 comprises a count or indication of a quantity of excursions exceeding a particular temperature threshold 332. For example, excursion count 342 comprises a count or indication of a quantity of times a series of temperature readings initially exceeds a particular temperature threshold 332. A "series" of temperature readings may comprise a single temperature reading or multiple consecutive temperature readings. Thus, in some embodiments, each temperature reading initially exceeding a particular threshold 332 (i.e., a transition from an immediately preceding temperature reading that does not exceed a particular temperature threshold 332 to a successive temperature reading that does exceed the particular temperature threshold 332) represents an excursion of the particular threshold, thereby resulting in an increment of excursion count 342 associated with the particular temperature threshold 332.

Consecutive count 344 comprises a count or indication of a quantity of consecutive temperature readings exceeding a particular temperature threshold 332. In some embodiments, consecutive count 344 may represent a maximum count or indication of a maximum quantity of consecutive temperature readings that have exceeded a particular temperature threshold 332 based on one or more different excursion time periods. For example, in some embodiments, time period count 348 comprises a count or indication of a quantity of consecutive temperature readings occurring during a particular excursion time period (e.g., a time period where one or temperature readings have exceeded a particular temperature threshold 332). Thus, different excursion time periods may have different quantities of consecutive readings exceeding the particular temperature threshold 332 (e.g., one excursion time period having five consecutive readings exceeding a threshold and another excursion time period having nine consecutive readings exceeding the threshold). Accordingly, in some embodiments, consecutive count 344 may represent a maximum count or indication of a maximum quantity of consecutive temperature readings that have exceeded a particular temperature threshold 332 as measured across multiple different excursion time periods (e.g., in the above example, consecutive count 344 would be nine). Therefore, in some embodiments, consecutive count 344 may be incremented responsive to an instance of consecutive readings exceeding the consecutive readings from a previous excursion time period. Using the above example as an illustration, if a successive excursion time period results in thirteen consecutive temperature readings exceeding the particular threshold 332, consecutive count 344 would be incremented from nine to thirteen.

Cumulative count 346 comprises a count or indication of a total quantity of temperature readings that have exceeded a particular temperature threshold 332. Thus, in some embodiments, cumulative count 346 is incremented each time a temperature reading exceeds a particular temperature threshold 332.

In operation, monitor logic 320 reads the temperature readings obtained by sensor 308 and compares the readings, represented in FIG. 3 as reading data 360, to one or more temperature thresholds $332_{1-n}$. If the temperature reading exceeds a particular temperature threshold $332_{1-n}$ counter logic increments counter data 340 (e.g., increments one or more of excursion count 342, consecutive count 344, cumulative count 346 and/or time period count 348). Monitor logic 320 may also cause various counter data 340 counts to be displayed and/or otherwise output. For example, in some embodiments, monitor logic 320 may cause excursion count 342, consecutive count 344 and cumulative count 346 to be displayed for one or more temperature thresholds $332_{1-n}$. However, it should be understood that the particular counts displayed may vary (e.g., only cumulative count 346, only excursion count 342, excursion count 342 and consecutive count 344, etc.).

Figure 4:
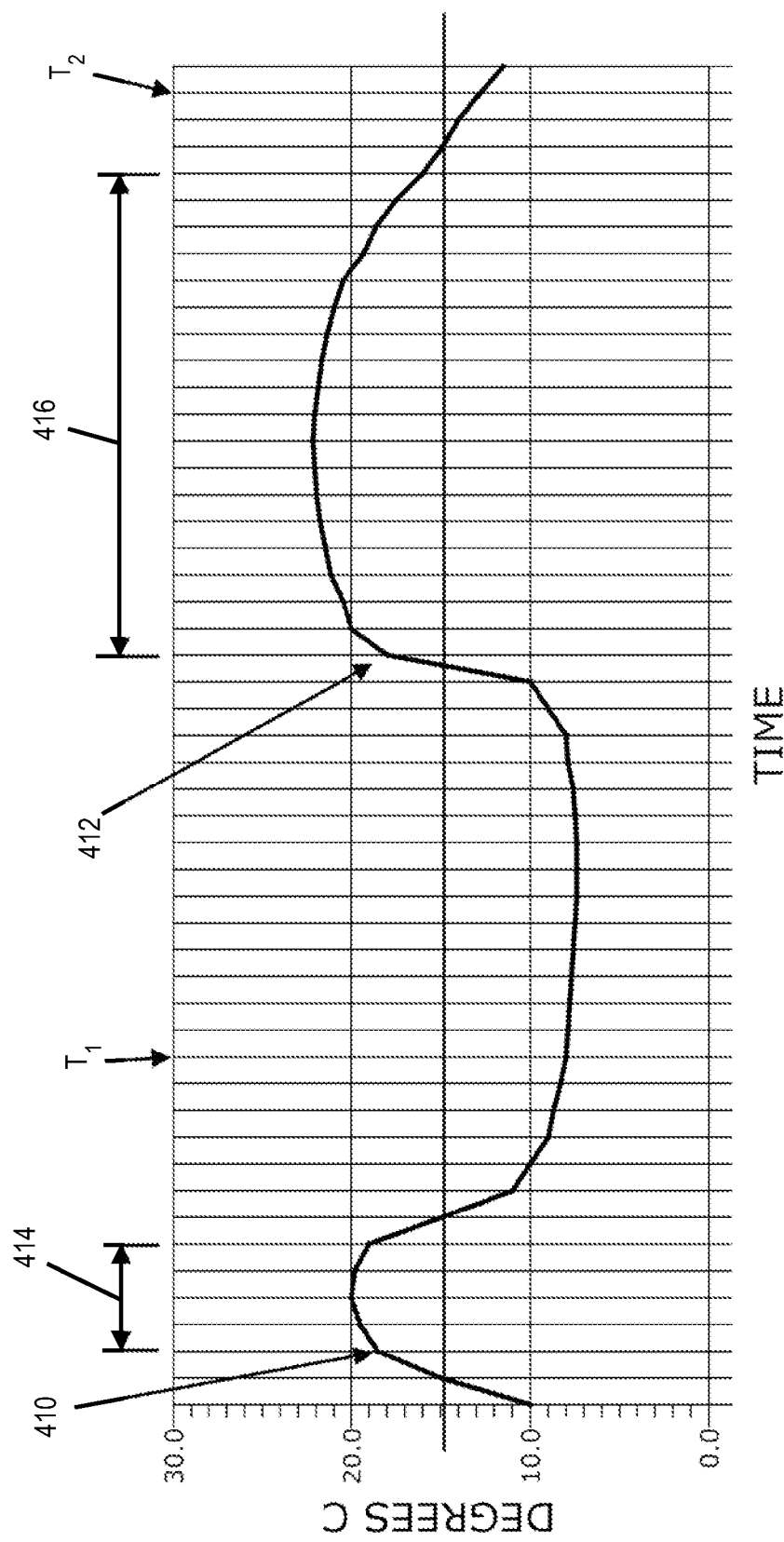
FIG. 4 is a diagram illustrating an embodiment of a counter schema utilizing the temperature monitoring device of the present disclosure.

FIG. 4 is a diagram illustrating an embodiment of a counter schema corresponding to the present disclosure. In FIG. 4, a line 402 represents a temperature of an environment monitored by device 100 as a function of time. As illustrated in FIG. 4, a temperature of 15° Celsius is set as a threshold 332, indicated by reference number 404. In FIG. 4, the vertical lines 406 represent occurrences at which temperature readings are made. In the illustrative example, an ascending temperature threshold 332 is set such that temperatures ascending above 15° Celsius are considered to exceed the temperature threshold 404.

As illustrated in FIG. 4, each temperature reading initially exceeding temperature threshold 404 is considered an excursion, represented by reference numbers 410 and 412. Further, each excursion time period in FIG. 4 where the temperature is exceeding temperature threshold 404 is represented by reference numbers 414 and 416. Thus, at the times indicated in FIG. 4 as $T_1$ and $T_2$, values corresponding to excursion count 342 (EX), consecutive count 344 (CS) and cumulative count 346 (CM) are indicated below in Table 1:

TABLE 1

|    | $T_1$ | $T_2$ |
|----|----|----|
| EX | 1  | 2  |
| CS | 5  | 19 |
| CM | 5  | 24 |

Thus, as illustrated by FIG. 4 and Table 1, excursion count 342 is incremented in response to a series of temperature readings initially exceeding temperature threshold 404, consecutive count 344 represents a maximum quantity of consecutive temperature readings exceeding temperature threshold 404 (e.g., incremented in response to a current excursion period consecutive count surpassing a previous excursion period consecutive count), and cumulative count 346 is incremented in response to each temperature reading exceeding temperature threshold 404.

Figure 5:
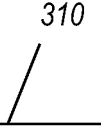
FIG. 5 is a diagram illustrating an embodiment of displayed counter data utilizing the temperature monitoring device of the present disclosure.

FIG. 5 is a diagram illustrating a display of count data 340 according to embodiments of the present disclosure. In FIG. 5, device 100 is configured having five different temperature thresholds 332 (indicated by numerals 1-5 in FIG. 5). Values corresponding to excursion count 342 (EX), consecutive count 344 (CS) and cumulative count 346 (CM) are indicated for a temperature threshold 332 designated as the third threshold are displayed, such as on display 310. In some embodiments, a user may cycle through the various set temperature thresholds 332 by depressing a button or other action. In some embodiments, the values for each temperature threshold 332 may be simultaneously displayed.

Figure 6:
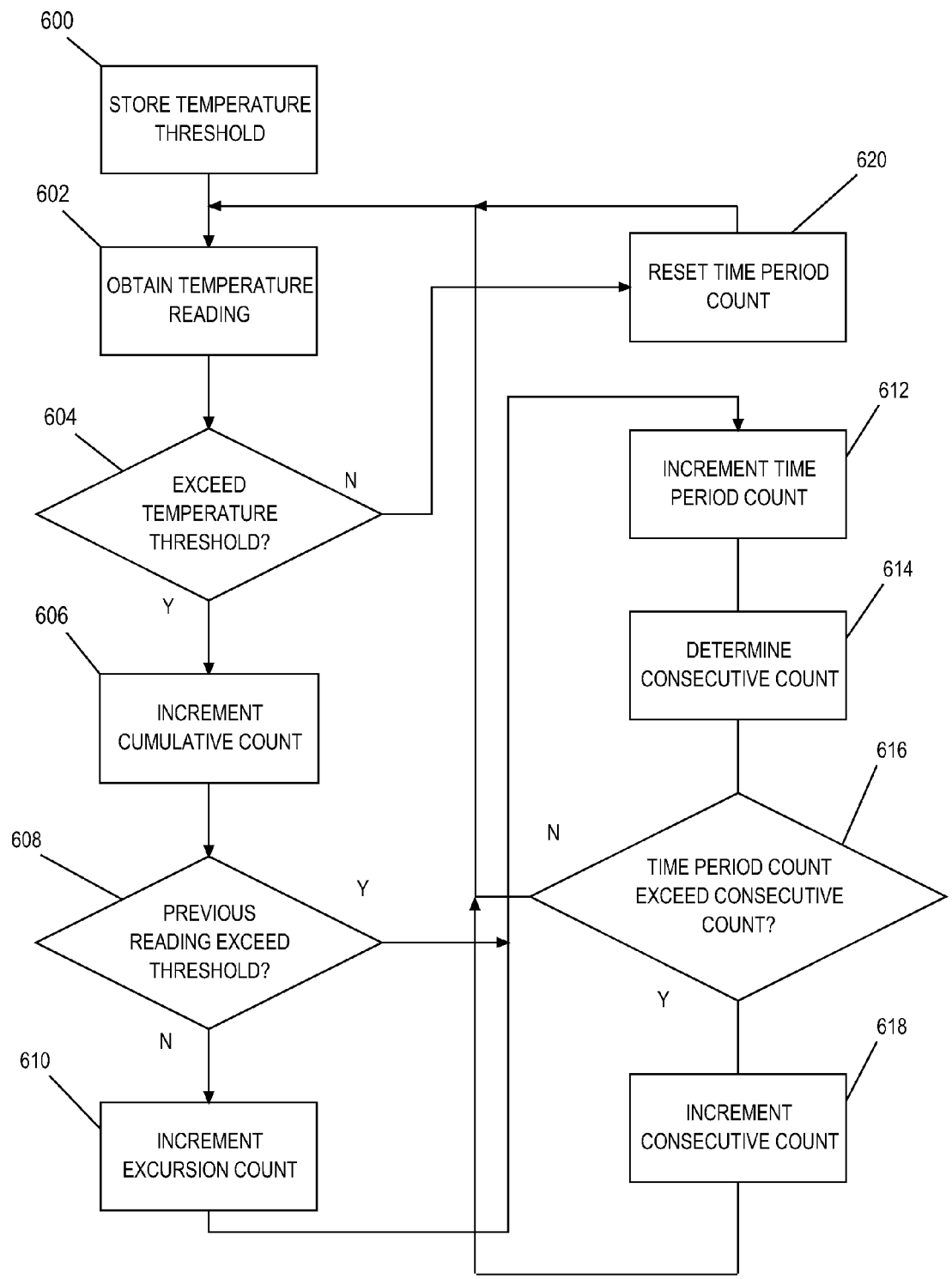
FIG. 6 is a flow diagram illustrating an embodiment of a method for monitoring temperature.

FIG. 6 is a flow diagram illustrating an embodiment of a method for monitoring the temperature of an environment associated with a temperature-sensitive object according the present disclosure. The method begins at block 600, where one or more temperature thresholds 332 are set or stored in device 100. At block 602, sensor 308 obtains and/or otherwise generates a temperature reading. At decisional block 604, monitor logic 320 determines whether the temperature reading exceeds the temperature threshold. If so, the method proceeds to block 606, where counter logic 322 increments cumulative count 346.

At decisional block 608, a determination is made (e.g., by counter logic 322) whether an immediately preceding temperature reading exceeded the temperature threshold. If not, the method proceeds to block 610, where counter logic 322 increments excursion count 342. If an immediately preceding temperature reading did exceed the temperature threshold, the method proceeds to block 612. At block 612, counter logic 322 increments time period count 348 corresponding to the current excursion period. At block 614, counter logic determines a value of consecutive count 344. At decisional block 616, a determination is made (e.g., by counter logic 322) whether time period count 348 for the current excursion period exceeds consecutive count 344. If so, the method proceeds to block 618, where counter logic 322 increments consecutive count 344. If not, the method returns to block 602. After block 618, the method returns to block 602.

At decisional block 604, if a determination is made that the temperature reading does not exceed the temperature threshold, the method proceeds to block 620, where counter logic resets time period count 348.

Thus, embodiments of the present disclosure enable monitoring of a temperature environment while providing a user with a variety of types of information corresponding to one or more monitored thresholds such as the quantity of excursions exceeding a temperature threshold, the quantity of consecutive readings when the threshold had been exceeded, and the cumulative quantity of readings exceeding the threshold.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A temperature monitoring device, comprising:
a housing configured to be disposed within or affixed to a transport container;
a sensor coupled to the housing and configured to obtain a plurality of temperature readings;
monitor logic configured to compare the plurality of temperature readings to a temperature threshold; and
counter logic configured to:
generate and display an excursion count indicating a quantity of excursion time periods the temperature readings exceeded the temperature threshold, the excursion count incremented in response to a series of temperature readings initially exceeding the temperature threshold;
generate and display a consecutive count indicating a maximum quantity of consecutive temperature readings exceeding the temperature threshold based on a plurality of different excursion time periods; and
generate and display a cumulative count indicating a cumulative quantity of temperature readings exceeding the temperature threshold based on the plurality of different excursion time periods.

2. The device of claim 1, wherein the counter logic is configured to:
determine whether a first temperature reading exceeds the temperature threshold; and
responsive to an immediately preceding temperature reading not exceeding the temperature threshold, increment the excursion count.

3. The device of claim 1, wherein the counter logic is configured to:
compare a quantity of consecutive temperature readings exceeding the temperature threshold occurring during a first excursion time period with the consecutive count; and
responsive to the quantity of consecutive temperature readings occurring during the first excursion time period exceeding the consecutive count, incrementing the consecutive count.

4. The device of claim 1, wherein the monitor logic is configured to vary a rate at which the temperature readings are obtained based on whether the temperature readings exceed the temperature threshold.

5. The device of claim 1, wherein the counter logic is configured to:
determine a quantity a consecutive temperature readings exceeding the threshold for a first excursion time period;
determine a quantity a consecutive temperature readings exceeding the threshold for a second excursion time period; and
in response to the quantity of the consecutive temperature readings exceeding the threshold for the second excursion time period being greater than the quantity of the consecutive temperature readings exceeding the threshold for the first excursion time period, increment the consecutive count to a value corresponding to the quantity of the consecutive temperature readings exceeding the threshold of the second excursion time period.

6. The device of claim 5, wherein the counter logic is configured to increment the cumulative count for each temperature reading exceeding the threshold for the first and second excursion time periods.

7. A temperature monitoring device, comprising:
a housing means configured to be disposed within or affixed to a transport container;
means, coupled to the housing means, for obtaining a plurality of temperature readings;
means for comparing the plurality of temperature readings to a temperature threshold; and
means for:
generating and displaying an excursion count indicating a quantity of excursion time periods the temperature readings exceeded the temperature threshold, the excursion count incremented in response to a series of temperature readings initially exceeding the temperature threshold;
generating and displaying a consecutive count indicating a maximum quantity of consecutive temperature readings exceeding the temperature threshold based on a plurality of different excursion time periods; and
generating and displaying a cumulative count indicating a cumulative quantity of temperature readings exceeding the temperature threshold based on the plurality of different excursion time periods.

8. A temperature monitoring device, comprising:
a housing configured to be disposed within or affixed to a transport container;
a sensor coupled to the housing and configured to obtain a plurality of temperature readings; and
a display configured to visually indicate:
an excursion count indicating a quantity of excursion time periods the temperature readings exceeded a temperature threshold, each excursion time period corresponding to an instance where a current temperature reading exceeds the threshold and a preceding temperature reading did not exceed the threshold;
a consecutive count indicating a maximum quantity of consecutive temperature readings exceeding the temperature threshold based on a plurality of different excursion time periods; and
a cumulative count indicating a cumulative quantity of temperature readings exceeding the temperature threshold based on the plurality of different excursion time periods.

9. The device of claim 8, further comprising logic configured to:
compare a quantity of consecutive temperature readings exceeding the temperature threshold occurring during a first excursion time period with the consecutive count; and
responsive to the quantity of consecutive temperature readings occurring during the first excursion time period exceeding the consecutive count, increment the consecutive count.

10. The device of claim 8, further comprising logic configured to:
determine a quantity a consecutive temperature readings exceeding the threshold for a first excursion time period;
determine a quantity a consecutive temperature readings exceeding the threshold for a second excursion time period; and
in response to the quantity of the consecutive temperature readings exceeding the threshold for the second excursion time period being greater than the quantity of the consecutive temperature readings exceeding the threshold for the first excursion time period, increment the consecutive count to a value corresponding to the quantity of the consecutive temperature readings exceeding the threshold of the second excursion time period.

11. The device of claim 10, further comprising logic configured to increment the cumulative count for each temperature reading exceeding the threshold for the first and second excursion time periods.

12. A computer program product for monitoring temperature during transport or storage of an object, the computer program product comprising:
 a computer readable storage medium having computer readable program code embodied therewith, the computer readable program code comprising computer readable program code configured to:
  obtain a plurality of temperature readings;
  generate an excursion count indicating a quantity of excursion time periods the temperature readings exceeded a temperature threshold, each excursion time period corresponding to an instance where a current temperature reading exceeds the threshold and a preceding temperature reading did not exceed the threshold;
  generate a consecutive count indicating a maximum quantity of consecutive temperature readings exceeding the temperature threshold based on a plurality of different excursion time periods;
  generate a cumulative count indicating a cumulative quantity of temperature readings exceeding the temperature threshold based on the plurality of different excursion time periods; and
  vary a frequency at which the temperature readings are obtained based on whether the temperature readings exceed the temperature threshold.

13. The computer program product of claim 12, wherein the computer readable program code is configured to increment the excursion count responsive to a first one of a series of temperature readings exceeding the temperature threshold.

14. The computer program product of claim 12, wherein the computer readable program code is configured to:
 determine whether a first temperature reading exceeds the temperature threshold; and
 responsive to an immediately preceding temperature reading not exceeding the temperature threshold, increment the excursion count.

15. The computer program product of claim 12, wherein the computer readable program code is configured to:
 compare a quantity of consecutive temperature readings exceeding the temperature threshold occurring during a first excursion time period with the consecutive count; and
 responsive to the quantity of consecutive temperature readings occurring during the first excursion time period exceeding the consecutive count, incrementing the consecutive count.

16. A method, comprising:
 obtaining a plurality of temperature readings of an environment corresponding to a transport container;
 comparing the plurality of temperature readings to a temperature threshold stored in a memory; and
 generating and displaying, by a processor unit:
  an excursion count indicating a quantity of excursion time periods the temperature readings exceeded the temperature threshold, each excursion time period corresponding to an instance where a current temperature reading exceeds the threshold and a preceding temperature reading did not exceed the threshold;
  a consecutive count indicating a maximum quantity of consecutive temperature readings exceeding the temperature threshold based on a plurality of different excursion time periods; and
  a cumulative count indicating a cumulative quantity of temperature readings exceeding the temperature threshold based on the plurality of different excursion time periods.

17. The method of claim 16, further comprising:
 comparing a quantity of consecutive temperature readings exceeding the temperature threshold occurring during a first excursion time period with the consecutive count; and
 responsive to the quantity of consecutive temperature readings occurring during the first excursion time period exceeding the consecutive count, incrementing the consecutive count.

* * * * *